(12) United States Patent
Lawson

(10) Patent No.: US 7,828,005 B2
(45) Date of Patent: Nov. 9, 2010

(54) FREEZELESS HYDRANT

(75) Inventor: David L. Lawson, Northeast, PA (US)

(73) Assignee: Zurn Industries, LLC, Erie, PA (US)

( * ) Notice: Subject to any disclaimer, the term of this patent is extended or adjusted under 35 U.S.C. 154(b) by 334 days.

(21) Appl. No.: 12/062,909

(22) Filed: Apr. 4, 2008

(65) Prior Publication Data

US 2008/0245418 A1   Oct. 9, 2008

Related U.S. Application Data

(60) Provisional application No. 60/921,889, filed on Apr. 5, 2007.

(51) Int. Cl.
F16K 24/00 (2006.01)

(52) U.S. Cl. ............... 137/15.02; 137/301; 137/218; 137/360

(58) Field of Classification Search ......... 137/15.02, 137/301, 360, 218, 217, 306, 304, 302, 291, 137/272

See application file for complete search history.

(56) References Cited

U.S. PATENT DOCUMENTS

| | | | |
|---|---|---|---|
| 1,104,869 A | 7/1914 | Bowser | |
| 1,427,098 A | 8/1922 | Fortier | |
| 2,580,197 A | 12/1951 | Schmid | |
| 2,605,781 A | 8/1952 | Schmid et al. | |
| 3,752,177 A | 8/1973 | Nordskog | |
| 4,071,038 A | 1/1978 | Robinson | |
| 4,700,732 A | 10/1987 | Francisco | |
| 4,766,923 A | 8/1988 | Roper | |
| 5,012,833 A * | 5/1991 | Hunley et al. ............. | 137/15.02 |
| 5,740,831 A | 4/1998 | DeNardo et al. | |
| 5,947,150 A | 9/1999 | Ryan | |
| 6,142,172 A | 11/2000 | Shuler et al. | |
| 6,752,167 B1 * | 6/2004 | Stanaland et al. ........... | 137/218 |
| 6,769,446 B1 | 8/2004 | Ball et al. | |
| 6,857,442 B1 | 2/2005 | Ball et al. | |
| 6,883,534 B2 | 4/2005 | Ball et al. | |

(Continued)

FOREIGN PATENT DOCUMENTS

JP      01219223 A      9/1989

OTHER PUBLICATIONS

Zurn, Ecolotrol Anti-Siphon, Non-Freeze Wall Hydrant, X-1310, 1975.

*Primary Examiner*—Kevin L Lee
(74) *Attorney, Agent, or Firm*—The Webb Law Firm

(57) ABSTRACT

A freezeless hydrant includes an operating screw positioned within a head member, an operating coupling mating with the operating screw, an operating rod coupled to the operating coupling and a plug and a valve seat. Movement of the operating rod in one direction disengages the plug from the valve seat permitting water to flow through the casing and an opening of a set screw forcing a ball against an O-ring seal. Movement of the operating rod in an opposite direction causes alignment of a radial opening in the operating coupling with a passageway in the operating screw. The operating rod engages the valve seat preventing water from flowing through the casing and allowing the ball to fall away from the O-ring seal. Air enters a chamber of the operating screw thereby draining water from the chamber and out of the radial opening of the operating coupling.

20 Claims, 11 Drawing Sheets

U.S. PATENT DOCUMENTS 7,401,620 B2 * 7/2008 Ball .......................... 137/301
7,428,910 B2 * 9/2008 Davidson et al. ............ 137/272
7,607,453 B2 * 10/2009 Poskin et al. ............... 137/360

* cited by examiner

FREEZELESS HYDRANT

CROSS REFERENCE TO RELATED PATENT APPLICATIONS

This application is based on U.S. Provisional Patent Application No. 60/921,889 filed Apr. 5, 2007, on which priority of this patent application is based and which provisional patent application is hereby incorporated by reference in its entirety.

BACKGROUND OF THE INVENTION

1. Field of the Invention

The present invention is generally directed to a wall hydrant, and more specifically, to a freezeless wall hydrant.

2. Description of Related Art

Wall hydrants function as outlets for controlling water flow therefrom. Specifically, wall hydrants are set within predefined areas of a wall and are then connected to plumbing lines. Since such wall hydrants are oftentimes mounted to an outside wall of a building, problems begin to arise when temperatures drop below freezing. In such situations, residual water remaining in the hydrant freezes and causes components in the hydrant to rupture.

Due to such problems, freezeless wall hydrants and faucets have been developed. Such hydrants characteristically have a fluid closure valve located in the end of an inlet pipe located within the wall or a warmer interior area of the building of which the wall is a part. This closure valve is operated by an elongated rod connected to an exterior handle. The freezeless characteristics of the hydrant are caused by the closure valve shutting off the flow of water within the wall or building at a freezing temperature, with the residual water in the inlet pipe flowing by gravity outwardly through the conventional outlet drain of the hydrant. However, such prior art freezeless wall hydrants still suffer from incomplete drainage of water remaining in certain areas of the hydrant.

Accordingly, a need exists for a wall hydrant that provides a more complete drainage after use, thereby avoiding damage due to the water freezing in the hydrant.

SUMMARY OF THE INVENTION

The present invention has met this need. The present invention is directed to a freezeless hydrant comprising a casing with a first end and a second end, a head member coupled to the first end of the casing, an operating screw with a head portion and a threaded portion positioned within the head member, an operating coupling with internal threading configured to mate with the threaded portion of the operating screw, an operating rod positioned within the casing with a first end coupled to the operating coupling and a second end coupled to a plug guide with a recess and a plug coupled to the recess of the plug guide by a screw, a valve housing coupled to the second end of the casing and a valve seat positioned within the valve housing.

The head member includes an outlet portion in fluid communication with an interior of the casing. The head portion of the operating screw protrudes from the head member and a head faceplate. The operating screw defines a relief port with a horizontal chamber and a vertical depending passageway communicating with the horizontal chamber and with an annular opening or groove located around the perimeter of the operating screw. A set screw having a central opening and several slots, a ball and an O-ring seal are positioned within the horizontal chamber of the operating screw. The operating coupling includes a radial hole or opening designed to align with the annular opening and the vertical depending passageway of the operating screw. The valve seat having an opening is adapted to engage the plug to prevent water from flowing into the casing and to permit water to flow through the casing when the plug is disengaged from the valve seat.

The operating rod moves longitudinally toward the head member when the operating screw is rotated in a first direction, thereby disengaging the plug from the valve seat to permit water to flow through the casing. The pressure from the water enters the operating coupling and the water flows through an opening of the set screw, thereby forcing the ball to seal against the O-ring seal of the relief port of the operating screw. On the other hand, when the operating screw is rotated in a direction opposite to the first direction, the radial opening of the operating coupling is aligned with the annular opening or groove around the operating screw and with the vertical depending passageway of the operating screw as the operating rod moves longitudinally away from the head member, thereby engaging the valve seat with the plug to prevent water from flowing through the casing. This loss of water pressure causes the ball to fall away from the O-ring seal of the relief port of the operating screw, thereby allowing air to enter the horizontal chamber of the operating screw and, thereby evacuating the water from the horizontal chamber of the operating screw, through the vertical depending passageway of the operating screw, and out of the radial opening of the operating coupling.

The hydrant of the present invention may further include a nozzle designed to receive a hose positioned in fluid communication with the outlet portion of the head member. The operating screw may be rotated using a key that is adapted to engage a head portion of the operating screw. The valve housing may be in fluid communication with a source of pressurized water.

A wall mount body may be secured to the head member allowing the hydrant to be mounted to a wall. The wall mount body may include a lockable cover. The lockable cover may be unlocked using the same key used to rotate the head portion of the operating screw. A wall locknut may be provided around the casing to further secure the hydrant to a wall.

The present invention is further directed to a method of operating the above-described freezeless wall hydrant.

These and other features and characteristics of the present invention, as well as the methods of operation and functions of the related elements of structures and the combination of parts and economies of manufacture will become more apparent upon consideration of the following description and the appended claims with reference to the accompanying drawings, all of which form a part of this specification, wherein like reference numerals designate corresponding parts in the various figures. As used in the specification and the claims, the singular form of "a", "an" and "the" include plural referents unless the context clearly dictates otherwise.

DETAILED DESCRIPTION OF THE PRESENT INVENTION

Figure 1:
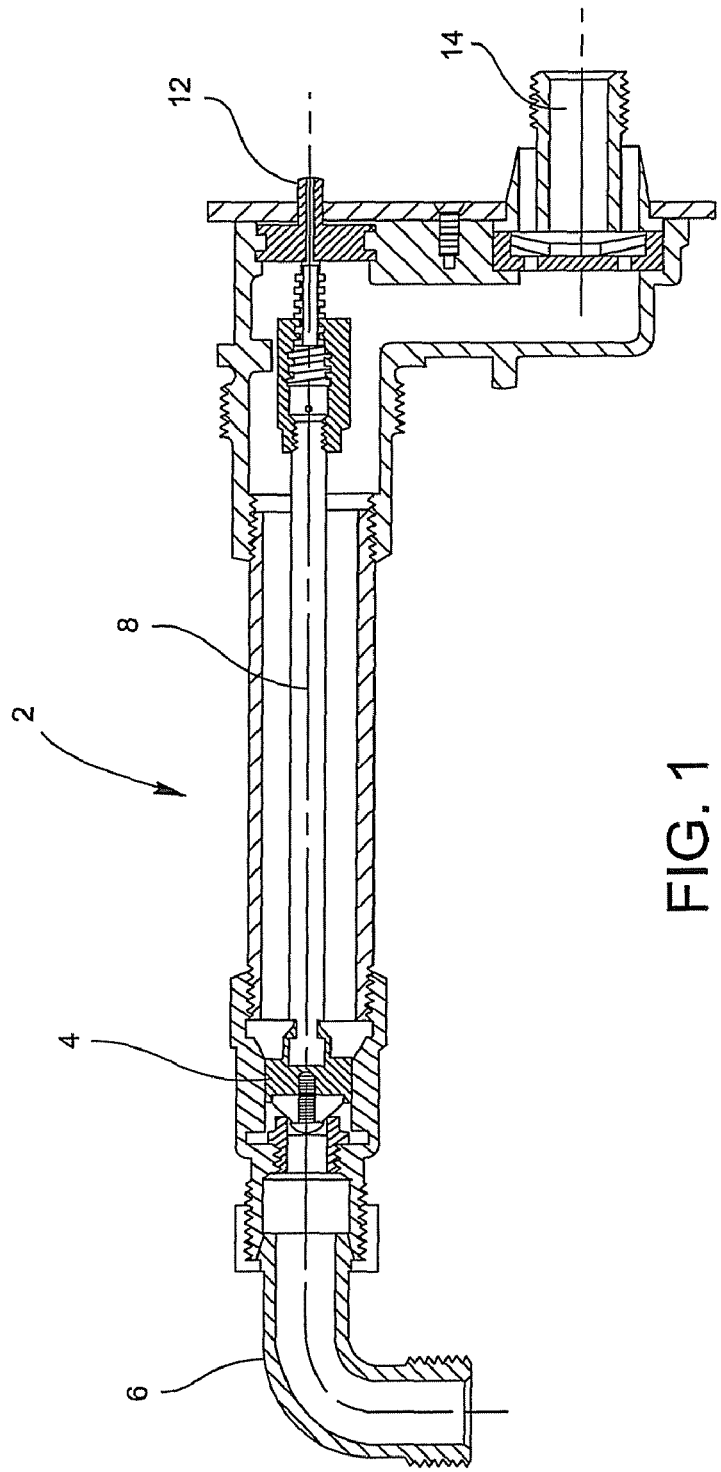
FIG. 1 is a cross-sectional view of a conventional wall hydrant.

For purposes of the description hereinafter, the terms "upper", "lower", "right", "left", "vertical", "horizontal", "top", "bottom", "lateral", "longitudinal" and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings and described in the following specification are simply exemplary embodiments of the invention. Hence, specific dimensions and other physical characteristics related to the embodiments disclosed herein are not to be considered as limiting.

FIG. 1 illustrates an example of a typical prior art freezeless wall hydrant 2 discussed hereinabove. Wall hydrant 2 has a fluid closure valve 4 located within the end of an inlet pipe 6 located within a wall (not shown) of a building (not shown). This closure valve 4 is operated by an elongated rod 8 connected to an exterior handle 12. This closure valve 4 is operated to shut off the flow of water to inlet pipe 6 during freezing conditions, wherein the residual water in inlet pipe 6 flows by gravity through outlet pipe 14, which generally is attached to a hose (not shown) in a manner well-known to those skilled in the art.

With reference to FIGS. 2-5, a freezeless hydrant 1 of the present invention includes a closure valve CV, a casing 3 with a first end 5 and a second end 7 and a head member 9 coupled to the first end 5 of casing 3. An operating screw 11 is positioned within head member 9. Operating screw 11 includes a head portion 13 protruding from head member 9 and head faceplate 10 and a threaded portion 15. Freezeless hydrant 1 also includes an operating coupling 17 with internal threading 19 configured to mate with threaded portion 15 of operating screw 11 and an operating rod 21 positioned within casing 3, with a threaded first end 23 coupled to threaded operating coupling 17, and a second end 25 coupled to a plug guide 26 that has a plug recess 28, and a plug screw 30 that couples the plug 27 to the plug guide 26. A valve housing 29 of closure valve CV is coupled to the second end of casing 3 and a valve seat 31 is positioned within valve housing 29.

Valve housing 29 is provided to be in fluid communication with a source of pressurized water (not shown). Valve seat 31 is adapted to engage plug 27 to normally prevent water flow into casing 3 and adapted to permit water flow through casing 3 when disengaged with plug 27.

Head member 9 further includes an outlet portion 33 in fluid communication with an interior chamber 35 of casing 3. A nozzle 37 designed to receive a hose (not shown) is provided in fluid communication with outlet portion 33 of head member 9. A sealing arrangement 39 is provided between outlet portion 33 of head member 9 and nozzle 37. Sealing arrangement 39 comprises a disc 36 with three holes 38, an Equa-Balance seal 40 and an O-ring seal 42 to form a vacuum breaker that prevents backflow and has anti-siphoning properties. Head portion 13 of operating screw 11 is designed to be engaged and rotated using a key 41. However, this is not to be construed as limiting as any suitable actuation device may be used to rotate operating screw 11.

A wall mount body 43 is secured to head member 9, thereby allowing hydrant 1 to be mounted on a wall (not shown). Wall mount body 43 includes a cover 45 with a locking element 47. Locking element 47 of cover 45 is designed to be unlocked using the same key 41 used to rotate operating screw 11. A wall locknut 49 and locknut screw 50 may be provided around casing 3 to further secure hydrant 1 to a wall.

Figure 2:
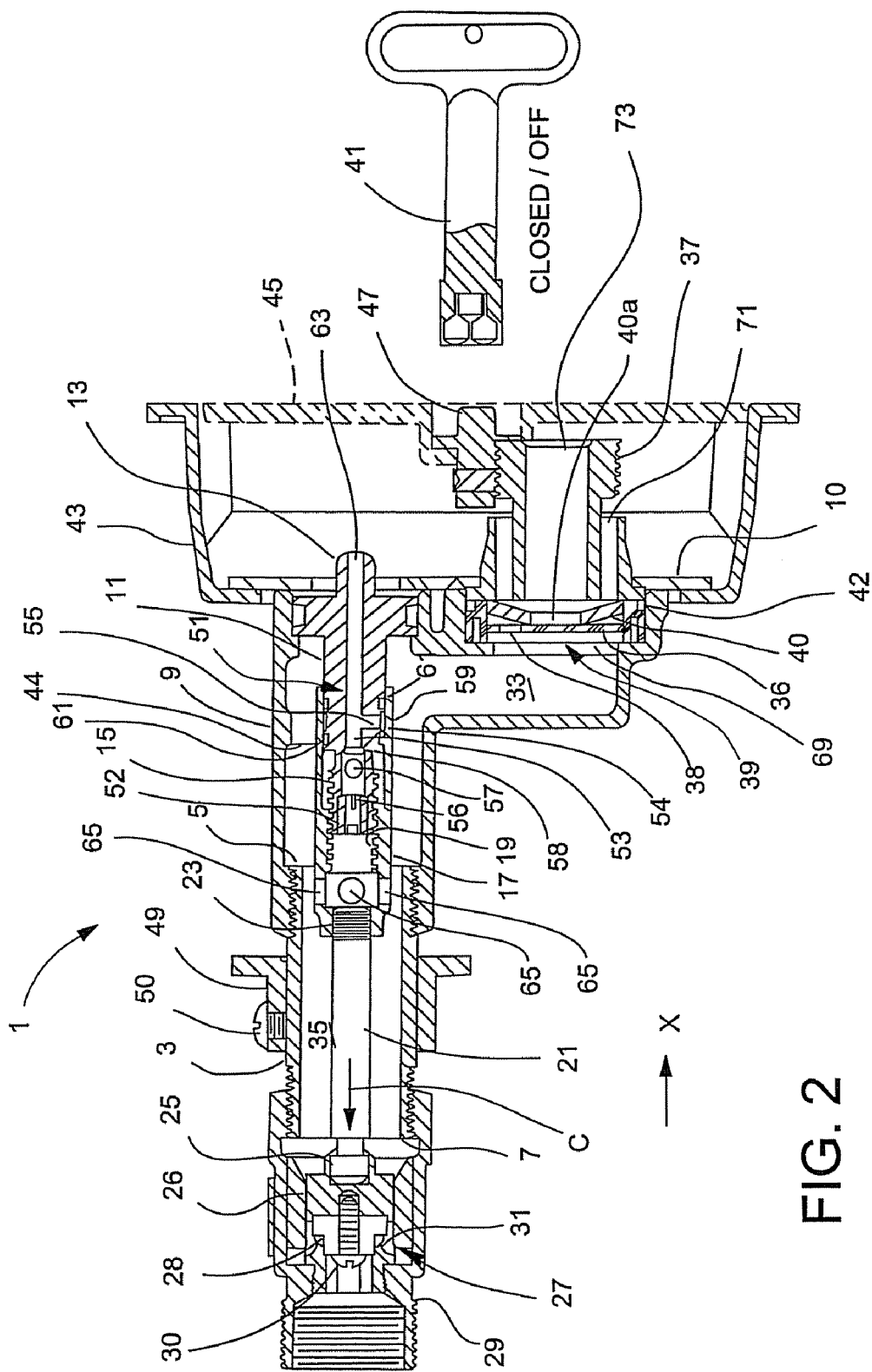
FIG. 2 is a cross-sectional view of a freezeless wall hydrant in accordance with the present invention in an off position.
Figure 2A:
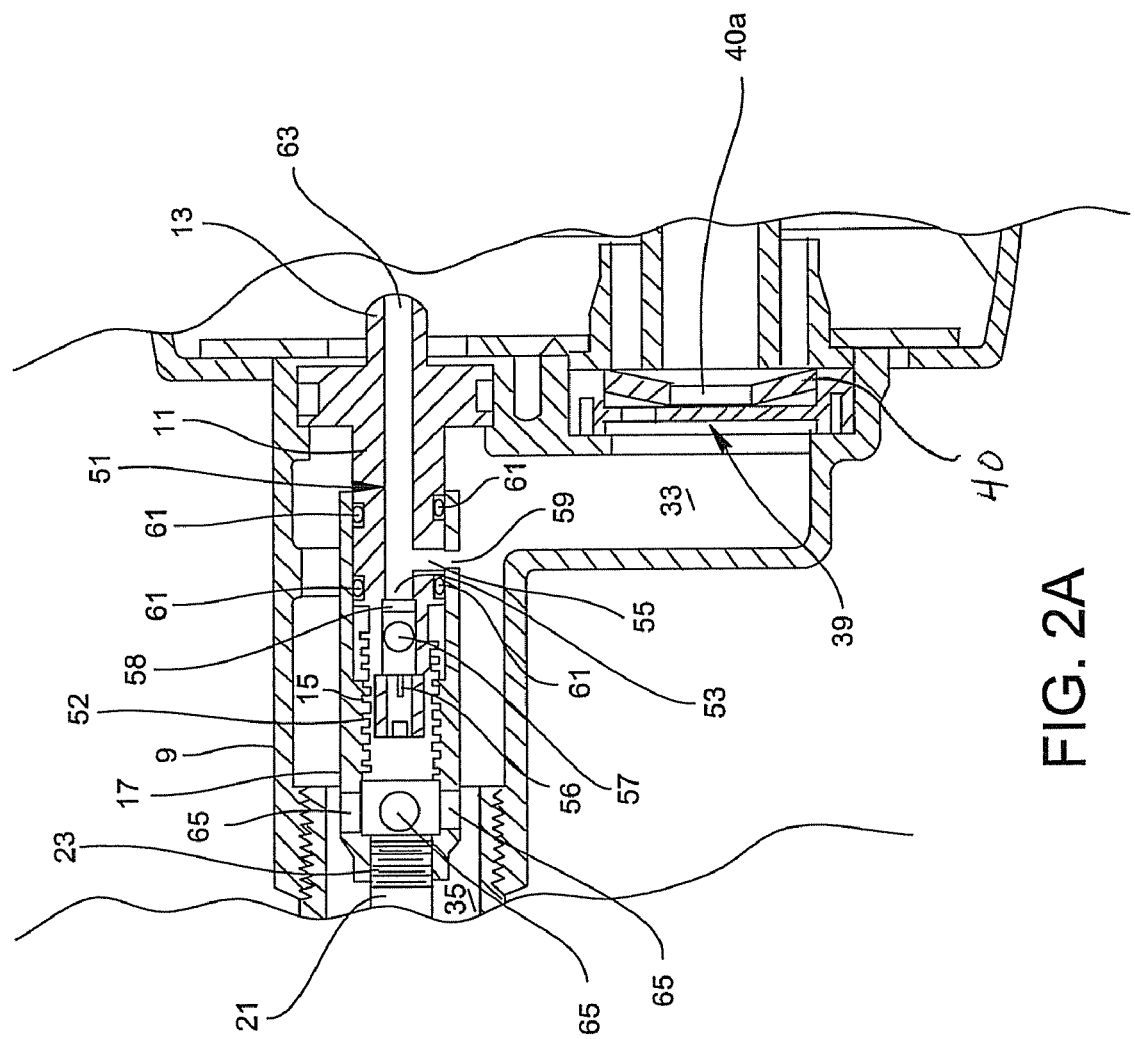
FIG. 2A is a partially enlarged cross-sectional view FIG. 2 showing a first end of an operating coupling and an operating screw of the freezeless wall hydrant.

Referring to FIGS. 2 and 2A, operating screw 11 defines a relief port 51 with a chamber 53 and a vertical depending passageway 55 in fluid communication with chamber 53 and in fluid communication with an annular opening or groove 54 (FIG. 2) which is positioned peripherally around operating screw 11. FIG. 2 more clearly illustrates the annular opening or groove 54 positioned peripherally around operating screw 11. Operating screw 11 includes a ball 57 and an adjacent sealing element 58 (e.g. O-ring seal), the latter of which is positioned within chamber 53. As shown in FIGS. 2 and 2A, chamber 53 extends in a first direction and may be referred to as a transverse chamber or a substantially horizontal chamber; whereas, passageway 55 extends in a second direction and may be referred to as a radial passageway or a vertical passageway relative to chamber 53.

Annular opening or groove 54 (FIG. 2) extends around the periphery of operating screw 11. Operating coupling 17 includes a radial opening 59, which is designed to align with annular opening 54 of operating screw 11 and with passageway 55 when hydrant 1 is in its off position illustrated in FIGS. 2 and 2A, and to be sealed or closed off when hydrant 1 is in its on position illustrated in FIG. 5. Operating coupling 17 further includes four holes or openings 65, three of which are shown in FIGS. 2 and 2A. Openings 65 are located and positioned 90° apart and are formed in a front portion of operating coupling 17.

Still referring to FIGS. 2-5, threaded portion 15 of operating screw 11 has a set screw 52, which includes four slots 56, each positioned 90° apart relative to each other and one of which is numbered in FIGS. 2-5 and a central opening or hole (not shown) passing through the center of set screw 52. Slots 56 are provided to prevent ball 57 from seating against the central opening or hole in set screw 52, thereby preventing hydrant 1 from draining. Slots 56 are positioned and designed so as to always allow air to enter for drainage of the excess water, i.e., water from operating screw 11. One or more perimeter seals (e.g., O-rings 61) are provided between operating screw 11 and operating coupling 17 to create a water-tight seal between these two elements. FIG. 2A more clearly illustrates two perimeter seals or O-rings 61. These perimeter seals 61 extend peripherally around operating screw 11 and are disposed within an annular groove (not numbered) extending around the perimeter of operating screw 11. FIG. 2A also more clearly illustrates that the passageway 55 of operating screw 11 is in alignment with a radial opening 59 located in operating coupling 17 and positioned below passageway 55 in FIG. 2A. A mounting member 44 is fixedly positioned within head member 9 and adjacent to operating coupling 17 to prevent rotation of operating coupling 17 during operation of operating screw 11.

A detailed operation of hydrant 1 will be described with reference to FIGS. 2-5. Key 41 is used to unlock locking element 47 and to open hinged cover 45, which cover 45 is shown in phantom in FIGS. 2 and 3-6D in a closed position. However, it is to be appreciated that hinged cover 45 is in an open position for operation of hydrant 1. In an open position of hydrant 1, the user may attach a hose to nozzle 37.

As stated herein above, in a closed position of hinged cover 45 and an off position for hydrant 1, the loss of water pressure causes the ball 57 to fall away from the sealing element or O-ring 58 as particularly demonstrated in FIGS. 2 and 2A. This allows air to first enter and then exit the horizontal chamber 53 as indicated by the arrows in FIG. 2C and the water to drain through the passageway 55 and out of radial opening 59 and out of hydrant 1. Thereafter, the user inserts key 41 over the head portion 13 of operating screw 11 and key 41 acts as a handle for rotating the head portion 13. The user rotates key 41 in a first direction, thereby rotating operating screw 11. This rotation of operating screw 11 causes threaded portion 15 of operating screw 11 to engage internal threading 19 of operating coupling 17, thereby moving the operating coupling 17 longitudinally toward head member 9 as particularly shown in FIG. 4. This movement, in turn, causes operating rod 21 to also move longitudinally toward head member 9 as indicated by the arrow A in FIG. 4, thereby disengaging plug 27 from valve seat 31 and allowing the water to flow from the source of pressurized water in valve housing 29 and through the interior chamber 35 of casing 3 to outlet portion 33 of head member 9.

Figure 5:
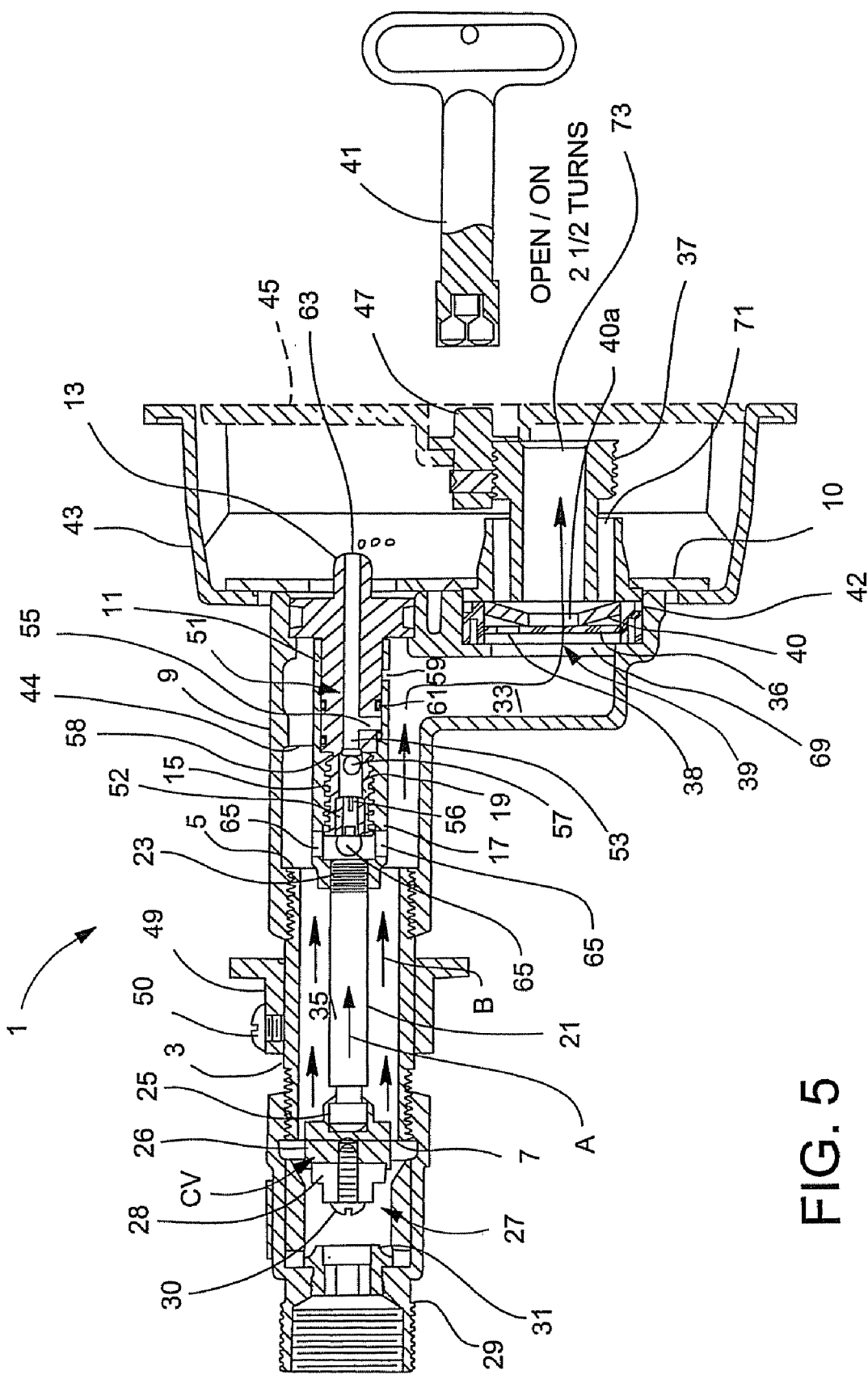
FIG. 5 is a cross-sectional view of the freezeless wall hydrant where the operating screw is in the on position.

As illustrated in FIG. 5 by the several arrows (one indicated by reference B), this water is discharged through an exit opening 69 in head member 9 and through holes 38 of disc 36, thereby moving Equa-Balance seal 40 forward to seal the plurality of relief holes 71 located in nozzle 37. The plurality of relief holes 71 may be as many as twelve. This water continues to flow through a central opening or hole 40a in Equa-Balance seal 4Q and out through central opening 73 of nozzle 37. Initially, the water has a low flow rate as the closure valve CV is opened forcing the ball 57 against the sealing element 58 in relief port 51 of operating screw 11. The pressure from the water flow forces ball 57 to hit and seal against sealing element 58 (FIG. 2B) in relief port 51 for as long as water is flowing through the interior chamber 35 of casing 3 as shown in FIG. 5. When water is flowing, slots 56 of set screw 52 and openings 65 in the front portion of operating coupling 17 are not aligned. Furthermore, radial opening 59 in operating coupling 17 is sealed or closed relative to the passageway 55 as particularly illustrated in FIG. 5.

When the user has finished using hydrant 1, he/she may rotate key 41 in a direction opposite the first direction thereby rotating operating screw 11 in a direction opposite to the first direction. This rotation causes operating coupling 17 to move longitudinally away from operating screw 11 as indicated by arrow C in FIG. 2 to align radial opening 59 in operating coupling 17 with the passageway 55 of operating screw 11. This movement of operating coupling 17 away from operating screw 11 causes the operating rod 21 to move longitudinally away from head member 9, thereby engaging plug 27 in valve seat 31 which prevents water from flowing in interior chamber 35 of casing 3.

Figure 2B:
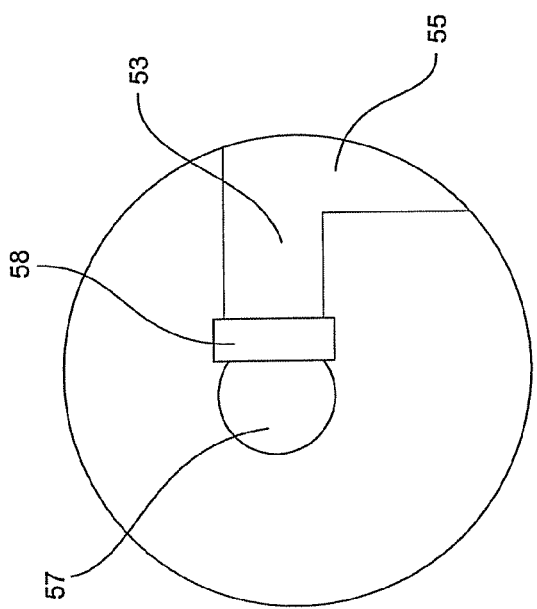
FIG. 2B is an enlarged, exaggerated, schematic view illustrating a ball tightly against a sealing element or O-ring seal of FIG. 2.
Figure 2C:
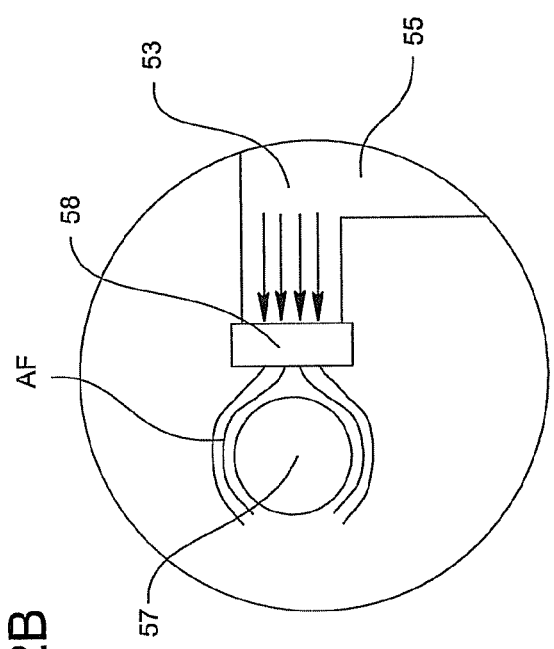
FIG. 2C is an enlarged, exaggerated, schematic view illustrating the ball falling away from the sealing element or O-ring seal of FIG. 2 and air flowing into a chamber of the operating screw.
Figure 3:
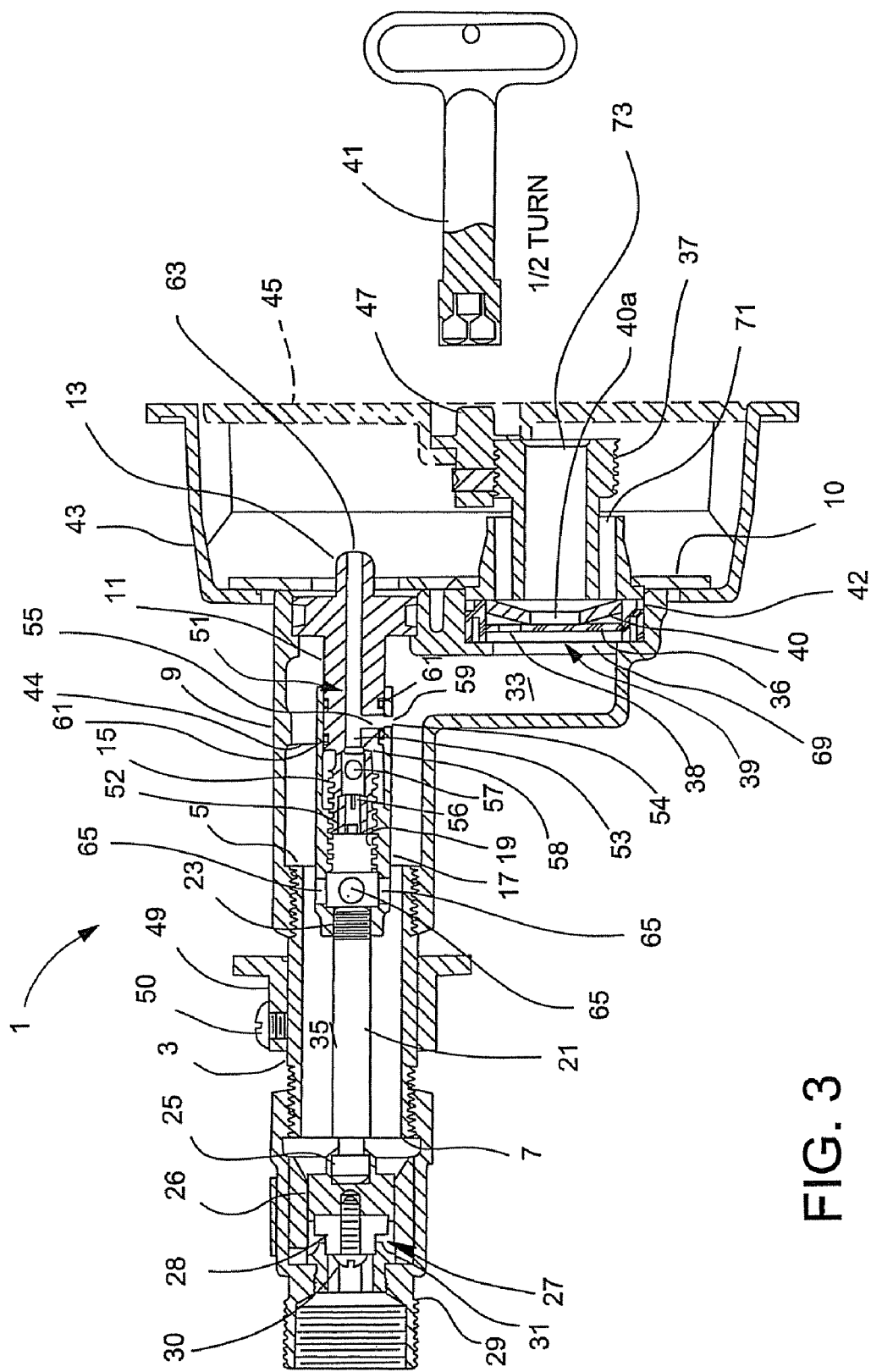
FIG. 3 is a cross-sectional view of the freezeless wall hydrant after a key has made one half revolution.
Figure 4:
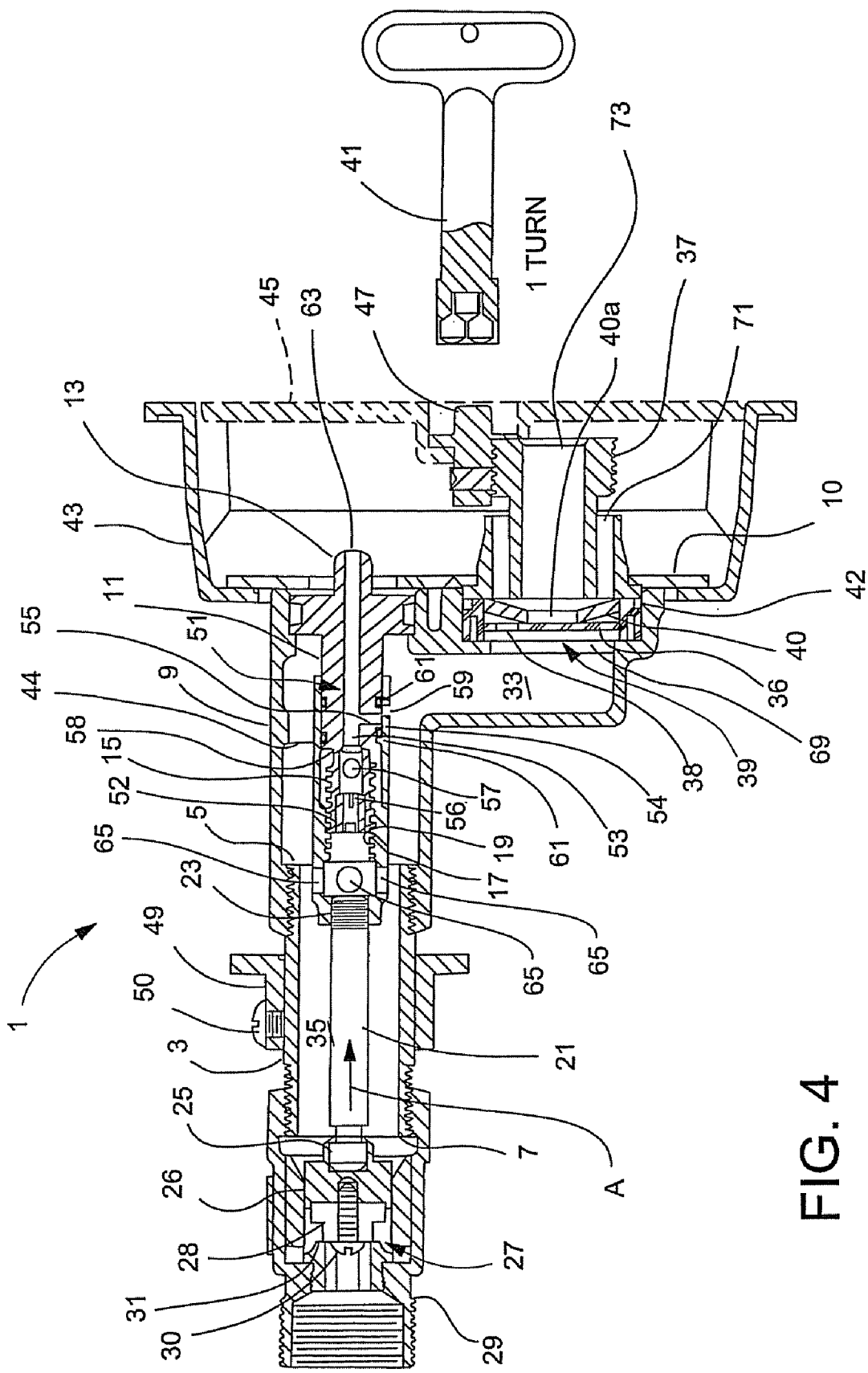
FIG. 4 is a cross-sectional view of the freezeless wall hydrant after the key has made one full revolution.

As clearly demonstrated in FIG. 2C, the closed position of hydrant 1 involves the loss of water pressure which causes ball 57 to fall away from sealing element 58 in relief port 51 of operating screw 11, thereby allowing air to first enter and then to exit the chamber 53 of operating screw 11 as illustrated by the arrows and the air flow lines (AF). In this closed position of hydrant 1 and with particular reference to the hydrant of FIG. 2, slots 56 of set screw 52 and openings 65 in the front portion of operating coupling 17 are aligned, thereby allowing the excess water to drain into outlet portion 33 of head member 9. Water also drains from the chamber 53 of operating screw 11 through the passageway 55 of operating screw 11 and out of radial opening 59 of operating coupling 17 due to the relief of the water pressure as discussed herein. This drainage of water ensures that no water remains in operating screw 11 after hydrant 1 has been used, thereby preventing damage to the functional components of hydrant 1 during freezing conditions. Specifically, initially ball 57 is positioned away from the horizontal chamber 53 of operating screw 11. An end 63 of horizontal chamber 53 is exposed to atmospheric pressure. Hence, outlet portion 33 of head member 9 is exposed to atmospheric pressure via radial opening 59 of operating coupling 17. Once operating screw 11 is rotated to open hydrant 1, operating coupling 17 moves in the longitudinal direction X shown in FIG. 2. Radial opening 59 becomes sealed from the chamber 53 of operating screw 11, thereby blocking the water from flowing into the chamber 53 of operating screw 11 and out of outlet portion 33 of head member 9.

The positioning of ball 57 against sealing element 58 as exaggerated in FIG. 2B blocks the relief port 51 in operating screw 11 because the pressure on the upstream side of ball 57 is higher (due to the water pressure) than the atmospheric pressure on the downstream side of ball 57. Pressurized water comes into contact with ball 57 via the four openings 65 of operating coupling 17 which are in fluid communication with the interior chamber 35 of casing 3. In this arrangement, chamber 53 of operating screw 11 is sealed from outlet portion 33 of head member 9 and from the atmosphere.

When hydrant 1 is closed as particularly illustrated in FIG. 2, the passageway 55 in operating screw 11 is open via radial opening 59 in operating coupling 17 to outlet portion 33 of head member 9 as well as to atmospheric pressure. Hence, the pressure on opposite sides of ball 57 is the same and ball 57 will fall from its sealed position against the sealing element 58 due to gravity (FIG. 2C), thereby permitting water to drain from the interior of the hydrant 1 through the chamber 53 of operating screw 11 and out of the end 63 of chamber 53. This will prevent damage to hydrant 1 during freezing conditions, even if a closed hose is connected to nozzle 37 and hydrant 1 has been shut off. Turning on hydrant 1 will result in blocking of chamber 53 of operating screw 11 as described hereinabove.

Figure 6A:
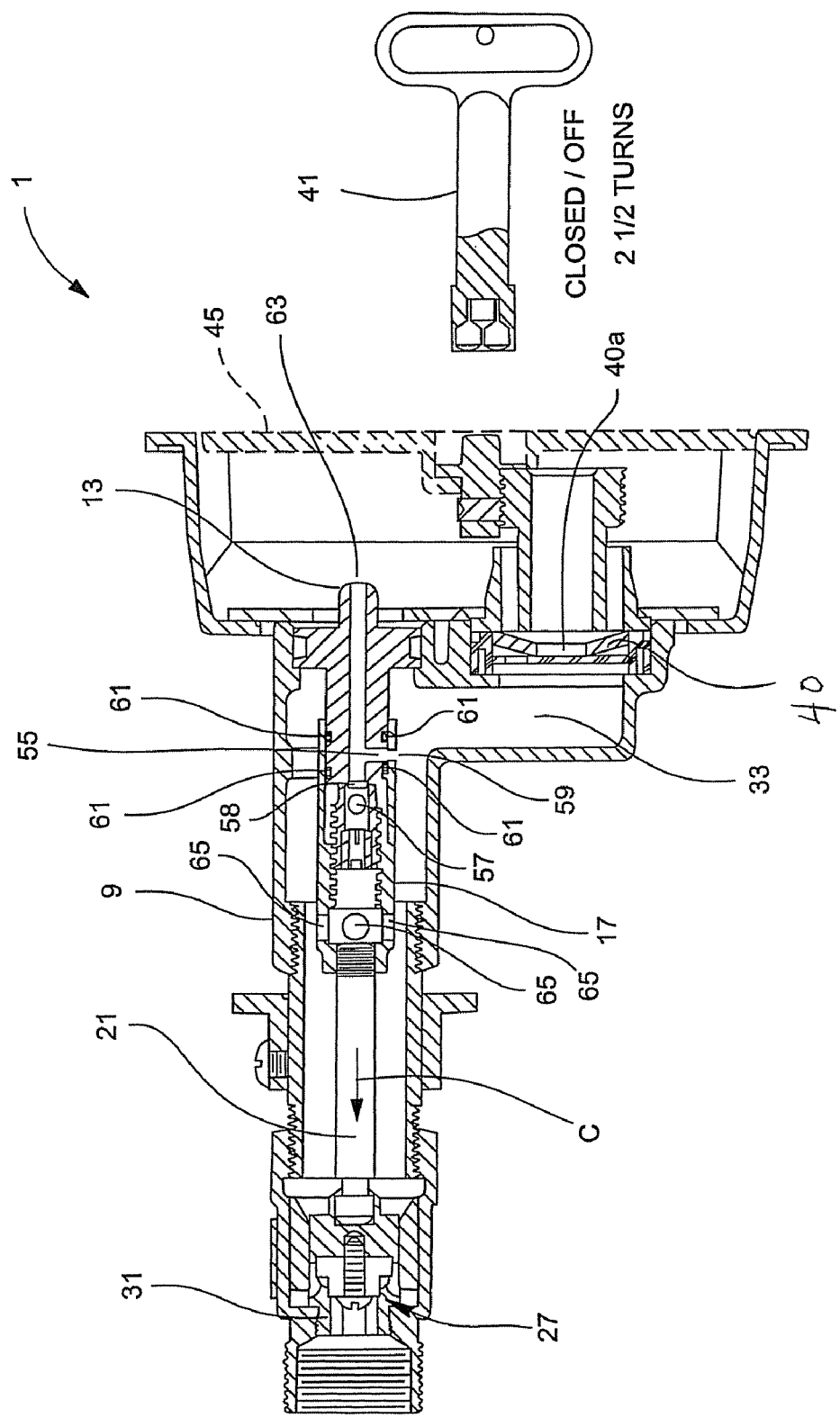
FIGS. 6A to 6D are various cross-sectional views of a freezeless wall hydrant in accordance with the present invention.

The operation of the key 41 relative to hydrant 1 of FIGS. 2-5 will now be given with reference to FIGS. 6A-6D. The components illustrated in FIGS. 6A-6D are the same as those appearing in FIGS. 2-5; however, some reference numbers have not been included for clarity purposes. FIG. 6A shows hydrant 1 in a completely closed position similar to FIG. 2 wherein plug 27 engages valve seat 31, passageway 55 of operating screw 11 is in alignment with radial opening 59 of operating screw 11, which, in turn, is in fluid communication with outlet portion 33 of head member 9, and ball 57 is spaced away from sealing element 58.

Figure 6B:
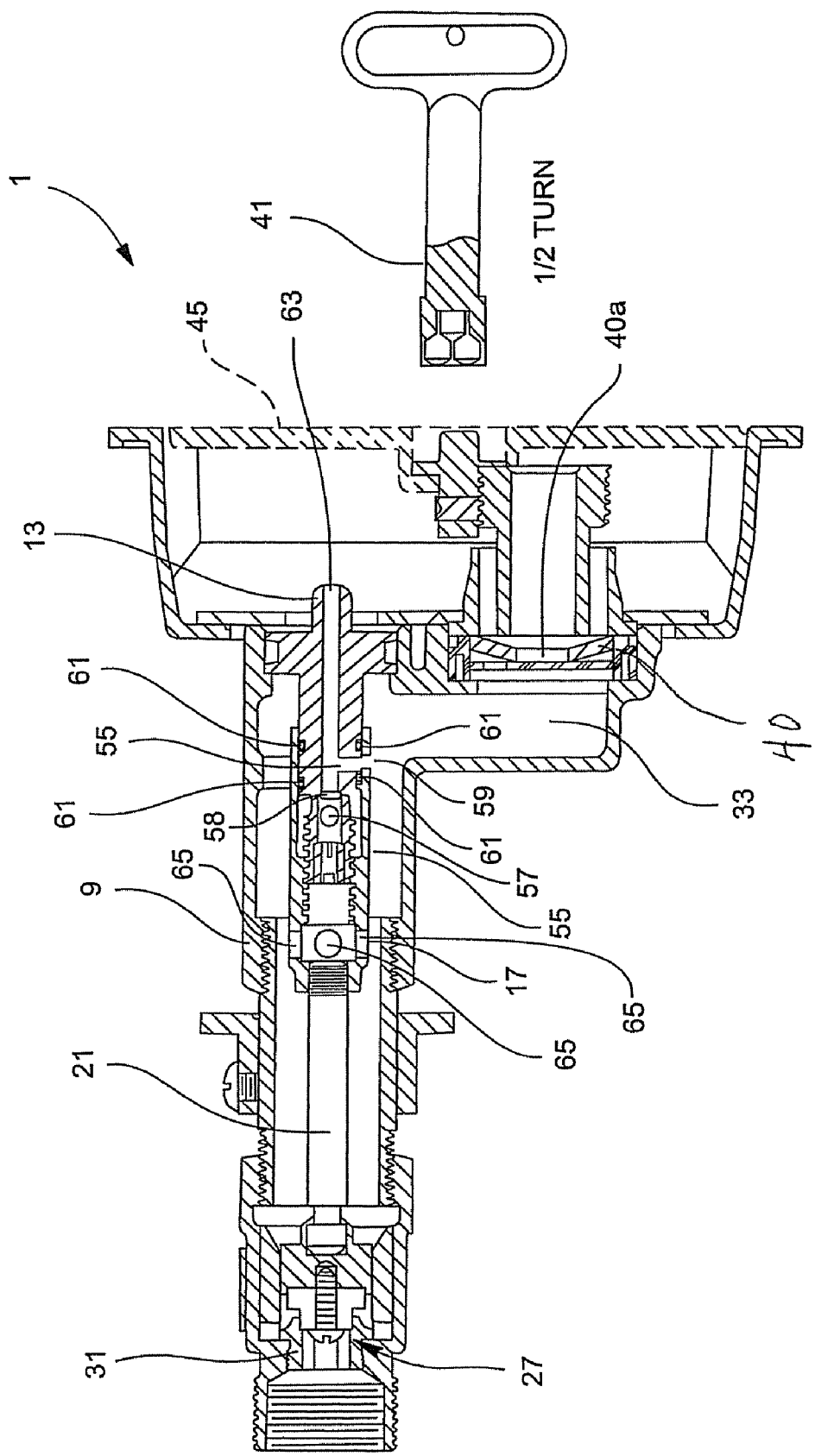
Figure 6C:
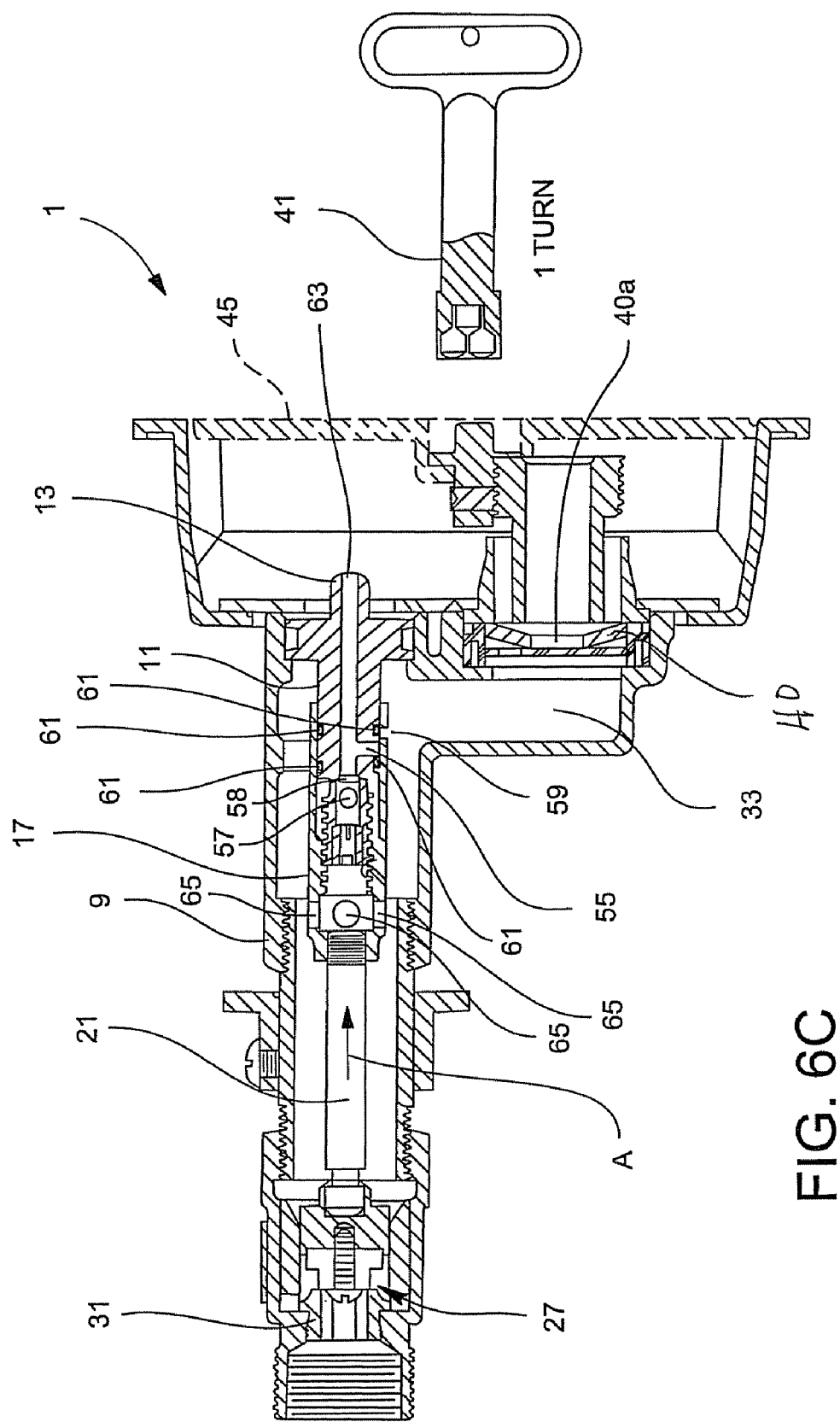
Figure 6D:
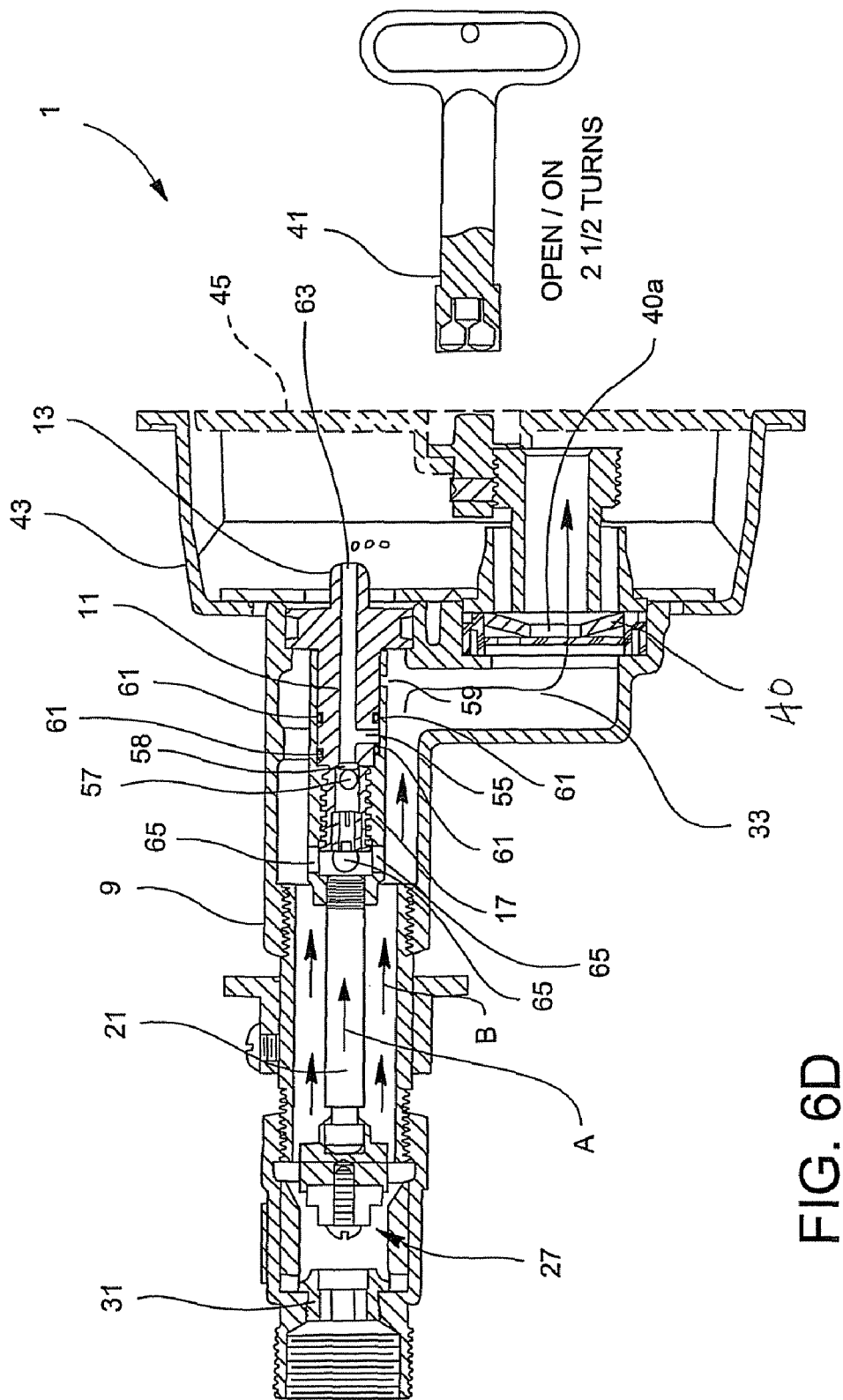

FIG. 6D shows hydrant 1 in a completely opened position, which occurs after the user has rotated key 41 two full rotations and one-half rotation relative to the closed position of FIG. 6A. This opened position is similar to that of FIG. 5 wherein plug 27 is disengaged from valve seat 31, operating coupling 17 is positioned completely over operating screw 11, passageway 55 of operating screw 11 is not in alignment with radial opening 59 in the bottom portion of operating screw 11, and ball 57 is tightly sealed against sealing element 58.

FIGS. 6B and 6C illustrate the opening process of hydrant 1, but prior to the water flowing from the source of pressurized water and through hydrant 1. FIG. 6B shows hydrant 1 after the key 41 has been rotated one-half rotation from the closed position of FIG. 6A. At this point, water has not yet started to flow through hydrant 1. At this position, passageway 55 of operating screw 11 is partially blocked from communication with outlet portion 33 of head member 9 and ball 57 is spaced away from sealing element 58. FIG. 6C shows hydrant 1 after the key 41 has been rotated one full rotation from the closed position of FIG. 6A where passageway 55 of operating screw 11 is completely blocked by operating coupling 17, thereby not allowing water to flow through hydrant 1, and ball 57 is spaced away from sealing element 58. In FIG. 6D, passageway 55 of operating screw 11 is still blocked from communicating with outlet portion 33 of head member 9, and ball 57 is positioned in a sealed position against sealing element 58, as discussed herein above.

It is to be appreciated that with regard to operating screw 11, ball 57 may be broadly defined as a blocking member. Sealing element 58 in relief port 51 of operating screw 11 may be an O-ring seal or any appropriate seal available in the marketplace. Set screw 52 may be broadly defined as being a stop having a central opening or hole and a plurality of slots each positioned about 90° apart relative to each other and adapted to allow air to enter for drainage of excess water from operating screw 11. Set screw or stop 52 may be positioned within the chamber 53 of operating screw 11 by being welded or glued to the inner surfaces of chamber 53 or via a force-fit and threaded.

Although the invention has been described in detail for the purpose of illustration, based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A freezeless hydrant comprising:
   a casing with a first end and a second end;
   a head member coupled to the first end of the casing and including an outlet portion in fluid communication with an interior of the casing;
   an operating screw with a head portion and a threaded portion positioned within the head member, the head portion protruding from the head member, the operating screw defining a relief port with a chamber and a passageway extending in fluid communication with the chamber, and the chamber including a blocking member and a sealing element;
   an operating coupling with internal threading configured to mate with the threaded portion of the operating screw, the operating coupling further including a radial opening;
   an operating rod positioned within the casing with a first end and a second end, the first end of the operating rod being coupled to the operating coupling and the second end of the operating rod being coupled to a plug;
   a valve housing coupled to the second end of the casing; and
   a valve seat positioned within the valve housing and adapted to engage the plug to prevent water from flowing into the casing, and adapted to permit water to flow through the casing when the plug is disengaged from the valve seat,
   wherein the operating rod moves longitudinally toward the head member when the operating screw is rotated in a first direction, thereby disengaging the plug from the valve seat, which permits water to flow through the casing, and wherein pressure from the water flow forces the blocking member to seal against the sealing element in the relief port of the operating screw; and
   wherein the radial opening of the operating coupling aligns with the passageway of the operating screw as the operating rod moves longitudinally away from the head member when the operating screw is rotated in a direction opposite to the first direction, thereby engaging the plug with the valve seat, which prevents water from flowing through the casing, and wherein a loss of water pressure causes the blocking member to fall away from the sealing element in the relief port of the operating screw to allow air to enter the chamber of the operating screw, and thereby evacuating water from the chamber through the passageway of the operating screw and out of the radial opening of the operating coupling.

2. The freezeless hydrant of claim 1 further comprising a stop provided within the chamber of the operating screw and spaced a distance away from the sealing element so that the blocking member may travel between the stop and the sealing member, said stop configured so that fluid is not completely prevented from passing through the chamber of the operating screw.

3. The freezeless hydrant of claim 2 wherein the stop defines a fluid passageway.

4. The freezeless hydrant of claim 2 wherein the blocking member is a ball, and wherein the stop is a set screw having a central opening and a plurality of slots for preventing the ball from seating against the set screw, thereby preventing the hydrant from draining and adapted to allow air to enter the operating screw for drainage of the excess water from the operating screw.

5. The freezeless hydrant of claim 4 wherein the stop is a set screw and wherein the sealing element is an O-ring seal.

6. The freezeless hydrant of claim 1 wherein the chamber is a transverse chamber and wherein the passageway is a radial passageway depending from the transverse chamber.

7. The freezeless hydrant of claim 1 wherein the chamber is a substantially horizontal chamber and wherein the passageway is a vertical passageway depending from the horizontal chamber.

8. The freezeless hydrant of claim 1 further comprising a nozzle designed to receive a hose positioned in fluid communication with the outlet portion of the head member.

9. The freezeless hydrant of claim 1 wherein the operating screw is rotated using a key that is adapted to engage the head portion of the operating screw.

10. The freezeless hydrant of claim 1 further comprising a wall mount body secured to the head member, allowing the hydrant to be mounted on a wall.

11. The freezeless hydrant of claim 10 wherein the wall mount body includes a lockable cover.

12. The freezeless hydrant of claim 11 wherein the lockable cover is unlocked using a key.

13. The freezeless hydrant of claim 1 further comprising a wall locknut provided around the casing to secure the hydrant to a wall.

14. A freezeless hydrant comprising:
   a casing with a first end and a second end;

a head member coupled to the first end of the casing and including an outlet portion in fluid communication with an interior of the casing;

an operating screw with a head portion and a threaded portion positioned within the head member, the head portion protruding from the head member, the operating screw defining a relief port with a horizontal chamber and a vertical passageway depending from the horizontal chamber and in fluid communication with the horizontal chamber, and the horizontal chamber including a ball and an O-ring seal;

an operating coupling with internal threading configured to mate with the threaded portion of the operating screw, the operating coupling further including a radial opening;

an operating rod positioned within the casing with a first end and a second end, the first end of the operating rod being coupled to the operating coupling and the second end of the operating rod being coupled to a plug including a plug guide;

a valve housing coupled to the second end of the casing; and a valve seat positioned within the valve housing and adapted to engage the plug to prevent water from flowing into the casing, and adapted to permit water to flow through the casing when the plug is disengaged from the valve seat, wherein the operating rod moves longitudinally toward the head member when the operating screw is rotated in a first direction, thereby disengaging the plug from the valve seat, which permits water to flow through the casing, and wherein pressure from the water flow forces the ball to seal against the O-ring seal in the relief port of the operating screw and, wherein the radial opening of the operating coupling aligns with the vertical depending passageway of the operating screw as the operating rod moves longitudinally away from the head member when the operating screw is rotated in a direction opposite to the first direction, thereby engaging the plug with the valve seat, which prevents water from flowing through the casing, and wherein a loss of water pressure causes the ball to fall away from the O-ring seal in the relief port of the operating screw to allow air to enter the horizontal chamber of the operating screw, and thereby evacuating water from the horizontal chamber through the vertical depending passageway of the operating screw and out of the radial opening of the operating coupling.

15. The freezeless hydrant of claim 14 further comprising a set screw provided within the chamber of the operating screw and spaced a distance away from the O-ring so that the ball may travel between the stop and the O-ring, said set screw configured so that the set screw does not completely prevent fluid from passing through the chamber of the operating screw.

16. The freezeless hydrant of claim 15 wherein the set screw has a central opening and a plurality of slots for preventing the ball from seating against the set screw, thereby preventing the hydrant from draining and adapted to allow air to enter the operating screw for drainage of the excess water from the operating screw.

17. A method of operating a freezeless hydrant, the steps comprising:

providing a casing with a first end and a second end;

providing a head member coupled to the first end of the casing and including an outlet portion in fluid communication with an interior of the casing;

providing an operating screw with a head portion and a threaded portion positioned within the head member, the head portion protruding from the head member, the operating screw defining a relief port with a chamber and a passageway extending from the chamber and in communication with the chamber, and the chamber including a blocking member and a sealing element;

providing an operating coupling with internal threading configured to mate with the threaded portion of the operating screw, the operating coupling further including a radial opening;

providing an operating rod positioned within the casing with a first end and a second end, the first end of the operating rod being coupled to the operating coupling and the second end of the operating rod being coupled to a plug;

providing a valve housing coupled to the second end of the casing; and providing a valve seat positioned within the valve housing and adapted to engage the plug to prevent water from flowing into the casing, and adapted to permit water to flow through the casing when the plug is disengaged from the valve seat;

rotating the operating screw in a first direction to move the operating rod longitudinally toward the head member, thereby disengaging the plug from the valve seat, which permits water to flow through the casing, and wherein pressure from the water flow forces the blocking member to seal against the sealing element in the relief port of the operating screw and, rotating the operating screw in a direction opposite to the first direction to move the operating rod longitudinally away from the head member, and wherein the radial opening of the operating coupling aligns with the passageway of the operating screw, thereby engaging the plug with the valve seat, which prevents water from flowing through the casing, and wherein a loss of water pressure causes the blocking member to fall away from the sealing element in the relief port of the operating screw to allow air to enter the chamber of the operating screw, and thereby evacuating water from the chamber through the passageway of the operating screw and out of the radial opening of the operating coupling.

18. The method of claim 17 wherein rotating the operating screw in the first direction achieves an opened position for the freezeless hydrant, and wherein rotating the operating screw two full rotations and one-half rotation from the opened position achieves a closed position for the freezeless hydrant.

19. The method of claim 17 the steps further comprising:

providing a wall mount body secured to the head member thereby allowing the hydrant to be mounted on a wall;

providing a lockable cover for the wall mount body; and unlocking the lockable cover by using a key.

20. The method of claim 17 the steps further comprising providing a stop within the chamber of the operating screw and spaced a distance away from the sealing element so that the blocking member may travel between the stop and the sealing member, said stop configured so that fluid is not completely prevented from passing through the chamber.

* * * * *